United States Patent [19]

Nakashima et al.

[11] Patent Number: 4,565,400
[45] Date of Patent: Jan. 21, 1986

[54] DOUBLE HAND FOR AN INDUSTRIAL ROBOT

[75] Inventors: Seiichiro Nakashima, Hino; Nobutoshi Torii, Hachioji; Akihiro Terada, Hino, all of Japan

[73] Assignee: Fanuc Ltd., Tokyo, Japan

[21] Appl. No.: 605,027

[22] PCT Filed: Aug. 11, 1983

[86] PCT No.: PCT/JP83/00262
§ 371 Date: Apr. 10, 1984
§ 102(e) Date: Apr. 10, 1984

[87] PCT Pub. No.: WO84/00713
PCT Pub. Date: Mar. 1, 1984

[30] Foreign Application Priority Data

Aug. 11, 1982 [JP] Japan .............................. 57-138403

[51] Int. Cl.[4] .................................................. B25J 15/00
[52] U.S. Cl. ...................................... 294/88; 294/103.1; 414/736
[58] Field of Search .................. 294/88, 67 BB, 86 R, 294/87 R, 103, 113; 414/618, 621, 729, 730, 736, 741, 744 A, 751; 901/31, 37, 39; 269/32, 33, 34, 109, 111, 118, 119, 155

[56] References Cited

U.S. PATENT DOCUMENTS 3,147,993  9/1964  Broderson et al. .................. 294/88
4,484,855 11/1984  Inaba et al. .......................... 294/88

Primary Examiner—James B. Marbert
Attorney, Agent, or Firm—Armstrong, Nikaido, Marmelstein & Kubovcik

[57] ABSTRACT

A double hand for an industrial robot comprises a hand body, two sets of work clamping units and two sets of actuators to drive the work clamping units, respectively, for opening and closing motions. The hand body has a rear end attachable to the free end of the robot wrist of an industrial robot, a front end and opposite sides extending between the front end and the rear end. Each work clamping unit has a pair of gripping fingers and the pairs of gripping fingers of the two sets of work gripping units are supported pivotally at the roots thereof on the opposite sides of the hand body for turning motion. The paired gripping fingers are turned about the respective roots thereof in opposite directions by the associated actuator.

4 Claims, 3 Drawing Figures

DOUBLE HAND FOR AN INDUSTRIAL ROBOT

TECHNICAL FIELD

The present invention relates to an industrial robot and, more particularly, to a robot double hand having two sets of gripping fingers.

BACKGROUND ART

Various robot double hands each having two sets of gripping fingers disposed on opposite sides of a hand body, and capable of being opened or closed, have been proposed to improve the working efficiency of industrial robots. In a typical conventional robot double hand, a pair of gripping fingers are moved slidably in opposite directions along the corresponding side of a hand body for opening and closing operations, and those gripping fingers always project a considerable distance from the hand body. Therefore, the gripping fingers when open are likely to interfere with the work during the approach of the double hand to the work, thus limiting the degree of freedom of the approach motion of the robot double hand toward the work.

Accordingly, it is an object of the present invention to provide a robot double hand for an industrial robot wherein the robot double hand is capable of avoiding the above-mentioned interference of the gripping fingers when the robot double hand approaches the work, so that the degree of freedom of the motion of the robot double hand in approaching a work can be increased.

It is another object of the present invention to provide a robot double hand for an industrial robot wherein the overall width of the robot double hand is narrower when each pair of the gripping fingers are in the open position.

DISCLOSURE OF THE INVENTION

The above-mentioned objects of the present invention are attained by a robot double hand for an industrial robot, comprising a hand body, two sets of work clamping means, and an actuator for controlling the opening and closing motions of each set of the work clamping means. The hand body has a rear end capable of being attached to the free end of the wrist of an industrial robot, a front end and opposite sides extending between the front end and the rear end, and each work clamping means has a pair of work gripping fingers; the root of each finger being supported pivotally for turning motion on the corresponding side of the hand body, and the actuator being adapted to turn the corresponding pair of the work gripping fingers on the roots thereof in opposite directions.

According to the present invention, the paired work gripping fingers of each work clamping means are turned in opposite directions on the respective roots on the corresponding side of a hand body, for opening and closing operations; namely, for releasing and holding operations. Therefore, the projecting length of the fingers from the side of the hand body when the fingers are open is reduced to a minimum necessary extent, so that the above-mentioned interference of the fingers with the work can be avoided.

BEST MODE OF CARRYING OUT THE INVENTION

A preferred embodiment of the present invention will be described hereinafter with reference to the accompanying drawings.

Figure 1:
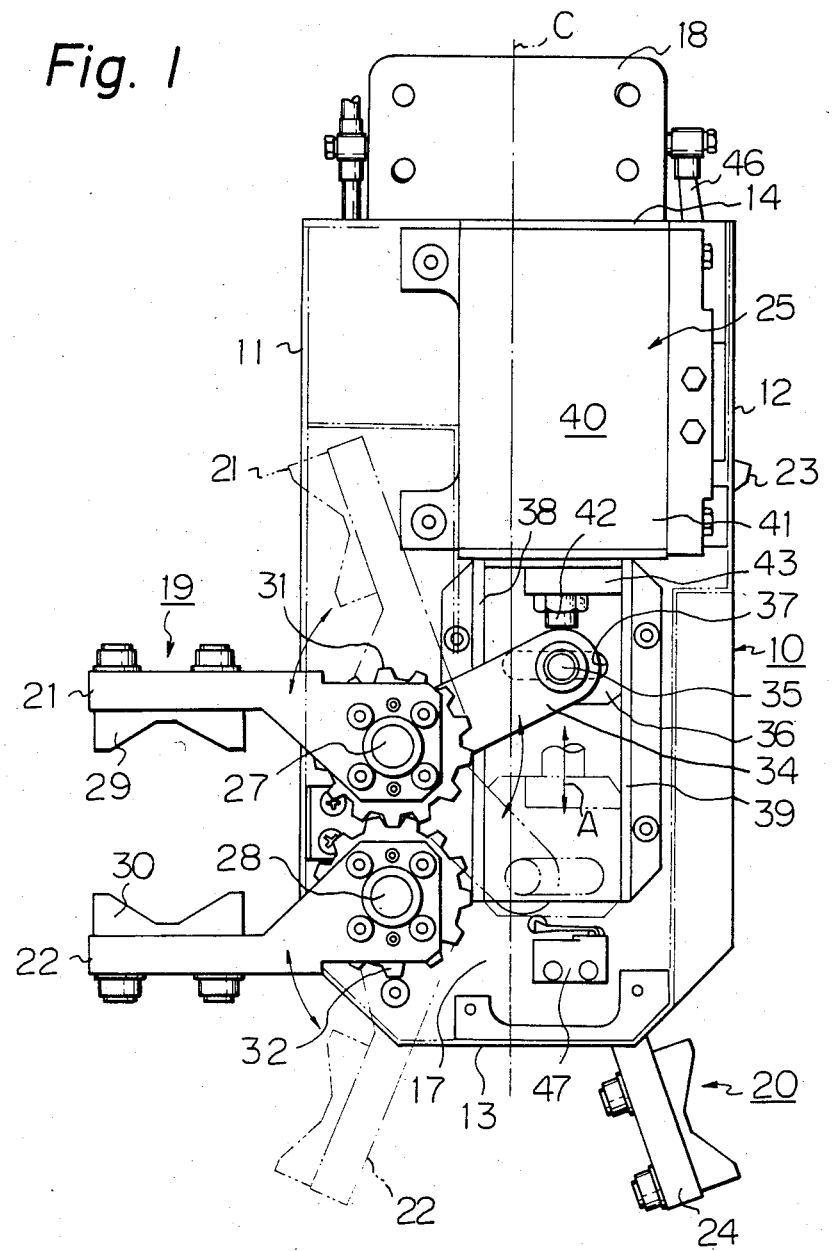
FIG. 1 is a plan view of a double hand for an industrial robot embodying the present invention, showing the internal mechanisms.
Figure 2:
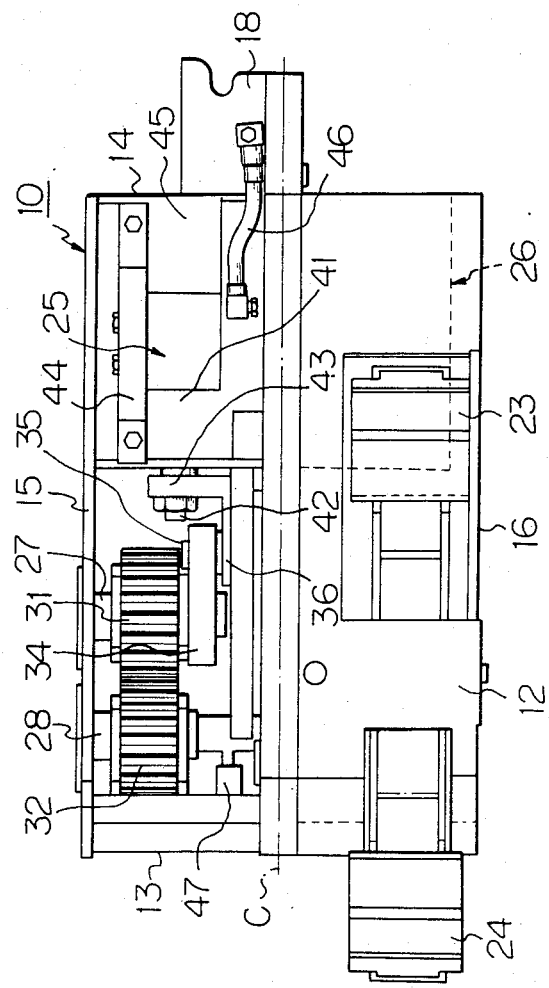
FIG. 2 is a side elevation of the double hand of FIG. 1 as seen along line II—II.
Figure 3:
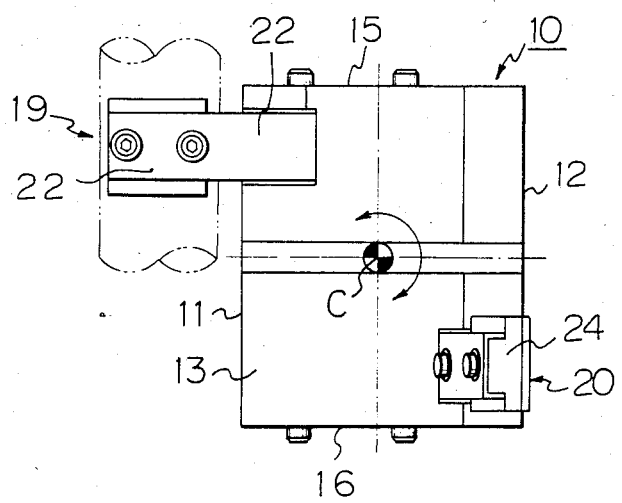
FIG. 3 is a front elevation of the double hand of FIG. 1 as seen from the front end thereof.

Referring to FIGS. 1 to 3, the double hand has a hand body 10. The hand body 10 consists of two parallel side plates 11 and 12, frame members 13 and 14 interconnecting the corresponding ends of the side plates 11 and 12, two cover plates 15 and 16 closing the upper and the lower sides, respectively, of a space defined by the side plates and the frame members, and a base plate 17 partitioning the space defined by the side plates, the frame members, and the cover plates into the upper side and the lower side, namely, the front side and the back side. The base plate 17 is fixedly joined to the side plates 11 and 12 the frame members 13 and 14. The frame member 13 and the frame member 14 form the front end and the rear end, respectively, of the hand body 10. The frame member 14 is provided with a bracket 18 for attaching the hand body 10 to the free end of a robot wrist of an industrial robot. It is usual to fix the bracket 18 to the free end of the robot wrist by means of a safety joint (not shown). The hand body 10 is capable of being turned about a center axis C by a rotative driving mechanism provided in the free end of the robot wrist.

Work clamping units 19 and 20 are provided on the opposite sides, respectively, and near the front side of the hand body 10. In this embodiment, the work clamping units 19 and 20 are disposed on the upper side and the lower side, respectively, of the base plate 17. The work clamping unit 19 has a pair of gripping fingers 21 and 22, while the work clamping unit 20 has a pair of gripping fingers 23 and 24. The gripping fingers 21 and 22 are capable of gripping a work (not shown) on one side of the hand body 10, while the gripping fingers 23 and 24 are capable of gripping a work (not shown) on the other side of the hand body 10. The work clamping unit 19 is controlled by an actuator, indicated generally by a reference numeral 25, for opening and closing motions; namely, for work releasing and work holding motions. The work clamping unit 20 is controlled by another actuator, indicated generally by a reference numeral 26 in FIG. 2, for opening and closing motions; namely, for work releasing and work holding motions. The actuator 25 and 26 are provided on the upper side and the lower side, respectively, of the base plate 17. The respective constructions of the work clamping units 19 and 20 and also the respective constuctions of the actuators 25 and 26 are indentical. Therefore, the construction of only one of the work clamping units, namely, the work clamping unit 19, and the construction of only one of the actuators, namely, the actuator 25, will be described in detail herein.

Referring to FIG. 1, the paired gripping fingers 21 and 22 are supported rotatably on the base plate 17 by axles 27 and 28 extending perpendicularly to the base plate 17, respectively. The centers of the axles 27 and 28 are arranged on a line extending in parallel to the side of the hand body 10 and are fixed to the cover plate 15. In this embodiment, the side of the hand body 10 is formed in parallel to the turning axis C extending longitudinally of the hand body 10. However, the side of the hand body 10 may be inclined with respect to the turning axis C so that the hand body 10 is tapered toward the front end thereof.

Gripping tips 29 and 30 are detachably attached to the extremities of the gripping fingers 21 and 22 respectively. The gripping tips of a shape corresponding to that of a work to be gripped are selectively attached to the gripping fingers 21 and 22.

The actuator 25 has gears 31 and 32 fixed to the roots of the gripping fingers 21 and 22, respectively. Although the form of the roots of the gripping fingers 21 and 22 is not limited to a particular form, the roots of the gripping fingers 21 and 22 of this embodiment are formed in the shape of a yoke. The gears 31 and 32 are inserted into the yokes and are fixed to the gripping fingers 21 and 22, respectively, with screws 33. The gears 31 and 32 have indentical dimensions and shapes and are meshed with each other. Accordingly, the gears 31 and 32 are turned through the same angle in the opposite directions. When the gears 31 and 32 are turned, the gripping fingers 21 and 22 are turned on the axles 27 and 28 in the opposite directions.

One end of a lever 34 is fixed to the gear 31. A pin 35 is attached pivotally to the other end of the lever 34 for rotation about its own axis. The pin 35 is fitted in a slot 37 formed in a slider 36. The slider 36 is disposed slidably between two parallel guides 38 and 39 fixed to the base plate 17. The slider 36 is linearly slidable only in a direction indicated by the arrow A, namely along the longitudinal direction of the hand body 10. The guides 38 and 39 may be formed integrally with the base plate 17.

The actuator 25 has a fluid-operated cylinder 40, for example, a pneumatic cylinder, for advancing and retracting the slider 36 along the guides 38 and 39. The cylinder 40 has a casing 41 secured to the base plate 17 and a piston rod 42 projecting from one end of the casing 41. The piston rod 42 is joined fixedly to the flange 43 of the slider 36 by screw means or the like.

Although not shown in the drawings, the interior of the casing 41 is partitioned by a piston fixed to the piston rod 42 into two pressure chambers, which are connected to a manifold 44. The manifold 44 is connected through a solenoid valve 45 to a fluid conduit 46. The working fluid, for example, pressurized air, is introduced alternately into the pressure chambers by the solenoid valve 45.

The hand body 10 is provided with a sensor to detect the arrival of the gripping fingers at the maximum open position, i.e., where the gripping fingers 21 and 22 are opened to the maximum extent. In the embodiment shown in the drawings, a limit switch 47 attached to the base plate 17 serves as the sensor. When the gripping fingers 21 and 22 are at the maximum open position, the slider 36 comes into engagement with the limit switch 47, causing the limit switching 47 to output a detection signal.

In FIG. 1, the gripping fingers 21 and 22 illustrated by a continuous line are at the closed position; namely, at the work gripping position. In this state, the piston rod 42 is retracted into the casing 41. When the working fluid is supplied into one of the pressure chambers of the casing 41 to expel the piston rod 42 from the casing 41, the slider 36 is moved toward the front end of the hand body 10, as illustrated by alternate long and two short dashes lines in FIG. 1. Consequently, the lever 34 is turned in a clockwise direction, as shown in FIG. 1. The turning motion of the lever 34 is transmitted to the gear 31 and further to the gear 32, so that the gripping fingers 21 and 22 fixed to the gears 31 and 32 respectively are turned in opposite directions to the opened position, as illustrated by alternate long and two short dashes lines in FIG. 1. When the gripping fingers 21 and 22 are moved to the maximum open position, the projecting lengths of the gripping fingers 21 and 22 from the side of the hand body 10 are reduced to a minimum extent.

The double hand then approaches one of a plurality of workpieces arranged, for example, on a pallet, with the gripping fingers 21 and 22 moved to the open position. The gripping fingers 21 and 22 are then moved toward the closed position to grip the work. Since the length of projection of the gripping fingers 21 and 22 from the side of the hand body 10 is reduced to a minimum extent while the hand body 10 is approaching a work, the possibility of the gripping fingers 21 and 22 interfering with the work is minimized. Therefore, the degree of freedom of motion of the double hand in approaching the work is increased.

The respective constitutions of the gripping fingers 23 and 24 and the actuator 26 of the work clamping unit 20 are identical with those of the above-mentioned gripping fingers 21 and 22 and the actuator 25, respectively. Accordingly, the paired gripping fingers 21 and 22 and the paired gripping fingers 23 and 24 can be controlled independently of each other.

In the embodiment illustrated in the drawings, the two sets of work clamping units 19 and 20 are disposed symmetrically with respect to the turning axis of the hand body 10. Accordingly, the two sets of work clamping units 19 and 20 can be used on the same level by turning the hand body 10 about the turning axis C through an angle of 180°.

Having described an specific embodiment of the present invention, it is obvious to those skilled in the art that the present invention is not limited to the above-mentioned embodiment and that various changes and modifications may be made in the invention without departing from the spirit and the scope thereof. For example, any other driving mechanism, such as a motor, or a power transmitting mechanism may be employed as the actuator, provided the mechanism is capable of turning paired gripping fingers in opposite directions.

CAPABILITY OF EXPLOITATION IN INDUSTRY

As is apparent from the above description, in a double hand according to the present invention, the projecting length of the gripping fingers at the open position is reduced to the minimum necessary extent, and hence the double hand can approach the work with the least possibility of the gripping fingers interfering with the work. Accordingly, work can be arranged on a pallet at reduced intervals so that the work density on a pallet is increased, which improves the working efficiency of the robot.

We claim:

1. A double hand for an industrial robot, comprising a hand body; two sets of work clamping means and two sets of actuators for opening and closing the work clamping means respectively; said hand body having a rear end attachable to the free end of the robot wrist of an industrial robot, a front end and opposite sides extending between the front end and the rear end; each of said work clamping means having a pair of gripping fingers; said pairs of gripping fingers being supported pivotally at the respective roots thereof on said hand body near the opposite sides of said hand body, respectively, for turning motion; and each of said actuators being adapted so as to turn the associated pair of the gripping fingers about respective centers provided in the roots of said gripping fingers in opposite directions to extend said work clamping means and said fingers thereon from and retract said work clamping means and said fingers thereon into the opposite sides of said hand body.

2. A double hand for an industrial robot according to claim 1, wherein said hand body has a base plate partitioning the hand body into a front side and a back side, the paired gripping fingers of one of said work clamping means are disposed near one side of the hand body on the front side of the base plate, and the paired gripping fingers of the other work clamping means are disposed near the other side of the hand body on the back side of the base plate.

3. A double hand for an industrial robot according to claim 2, wherein said two sets of work clamping means are disposed symmetrically with respect to the axis of turning of the hand body.

4. A double hand for an industrial robot according to claim 1, wherein each of said actuators comprises a pair of gears fixed to respective said roots of said paired gripping fingers and meshed with each other, a lever projecting from one of said gears and a fluid-operated cylinder having a retractable rod connected to said lever.

* * * * *